(12) United States Patent
Cloutier et al.

(10) Patent No.: US 12,285,814 B2
(45) Date of Patent: Apr. 29, 2025

(54) REVERSIBLE CUTTING TOOL (71) Applicant: 2446914 Ontario Inc., Vars (CA)

(72) Inventors: Alexandre Cloutier, Orleans (CA); Gabriel Brennan, Rockland (CA)

( * ) Notice: Subject to any disclaimer, the term of this patent is extended or adjusted under 35 U.S.C. 154(b) by 208 days.

(21) Appl. No.: 17/849,061

(22) Filed: Jun. 24, 2022

(65) Prior Publication Data

US 2022/0410292 A1     Dec. 29, 2022

Related U.S. Application Data

(60) Provisional application No. 63/215,106, filed on Jun. 25, 2021.

(51) Int. Cl.
| | |
|---|---|
| *B23D 15/08* | (2006.01) |
| *B23D 15/00* | (2006.01) |
| *B23D 29/02* | (2006.01) |
| *B23D 35/00* | (2006.01) |

(52) U.S. Cl.
CPC ............ *B23D 15/08* (2013.01); *B23D 15/002* (2013.01); *B23D 29/026* (2013.01); *B23D 35/005* (2013.01)

(58) Field of Classification Search
CPC ............. Y10T 83/8769; Y10T 83/8821; Y10T 83/8822; Y10T 83/8831; Y10T 83/8832; B23D 15/08; B23D 15/002; B23D 15/00; B23D 15/06; B23D 29/026; B23D 29/00; B23D 29/02; B23D 29/005; B23D 35/005; B23D 35/002; B23D 35/00; B23D 35/001; B23D 35/004; B23D 2015/007

See application file for complete search history.

(56) References Cited

U.S. PATENT DOCUMENTS

| | | | | |
|---|---|---|---|---|
| 3,934,342 | A * | 1/1976 | Matsushita | ............. B26B 5/005 30/293 |
| 4,257,294 | A * | 3/1981 | Stoveken | ............... B26D 1/025 83/578 |
| 5,036,740 | A * | 8/1991 | Tsai | .................... B65H 35/0086 83/614 |
| 5,044,075 | A * | 9/1991 | Brennan | ................. F22B 37/00 83/745 |
| 5,425,295 | A * | 6/1995 | Peters | ................... B26F 1/3853 83/578 |

* cited by examiner

*Primary Examiner* — Phong H Nguyen
(74) *Attorney, Agent, or Firm* — Andrews Robichaud PC; Alessandro Colonnier (57) ABSTRACT

The present disclosure provides a reversible cutting tool to cut a material such as sheet metal on a press brake. The reversible cutting tool is further comprised of a handle portion to grip and move the cutting tool, wheels to allow the cutting tool to slide along the press brake, a blade portion to cut the material, and an adjustable cutting mechanism. The adjustable cutting mechanism allows the reversible cutting tool to pivot and cut the material in two different directions, and also allows the cutting tool to be set in a third storage position. In a preferred embodiment, the adjustable cutting mechanism is comprised of a channel on an underside of the cutting portion, the channel configured to receive a plunger, the plunger to slide between two opposed cutting positions and a storage position.

8 Claims, 11 Drawing Sheets

REVERSIBLE CUTTING TOOL

CROSS REFERENCE TO RELATED APPLICATION

The present application claims priority to U.S. Provisional Application No. 63/215,106, entitled "REVERSIBLE CUTTING TOOL" filed on Jun. 25, 2021, the contents of which are incorporated herein by reference in their entirety.

FIELD

The disclosure relates to the field of mechanical accessories, and more specifically to a reversible cutting tool for use in press brakes to cut in two directions.

BACKGROUND

There are many accessories for press brakes, and one of the more popular ones is a cutting tool to cut sheet metal. These cutting tools are equipped with rollers that cooperate with the press brake to roll along said press brake in one direction. The cutting tool has a cutter to cut the sheet metal. Once a cut has been made, the cutting tool rolls off the press brake and an operator mut place it on the ground, on the press brake or somewhere else while the sheet metal is further manipulated.

Once ready for the next cut, the operator again connects the cutting tool with the press brake, and cuts the sheet metal. This operation is repeated any number of times to cut as desired.

Unfortunately, a number of problems exist with this method of operation. First, the cutting tool must constantly be placed down and picked up again for each cut, resulting in wasted time. Second, the cutting tool only cuts in one direction, such that it is placed on the press brake, removed, and placed again at the original starting point. Again, this method wastes precious time. Finally, the cutting tool can often be misplaced and therefore is lost, resulting in further expenses.

As such, there is a need for a new cutting tool that can overcome the deficiencies in the art noted above.

SUMMARY

In an aspect, the present disclosure provides a reversible cutting tool for use with press brakes, the reversible cutting tool comprising: a handle portion to grip the cutting tool; sliding components engaged with the handle portion to move the cutting tool along a length of the press brake; a blade portion connected to the sliding components to cut a material; and, an adjustable cutting mechanism allowing the blade portion to cut the material in two directions.

BRIEF DESCRIPTION OF THE DRAWINGS

The following figures serve to illustrate various embodiments of features of the disclosure. These figures are illustrative and are not intended to be limiting.

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
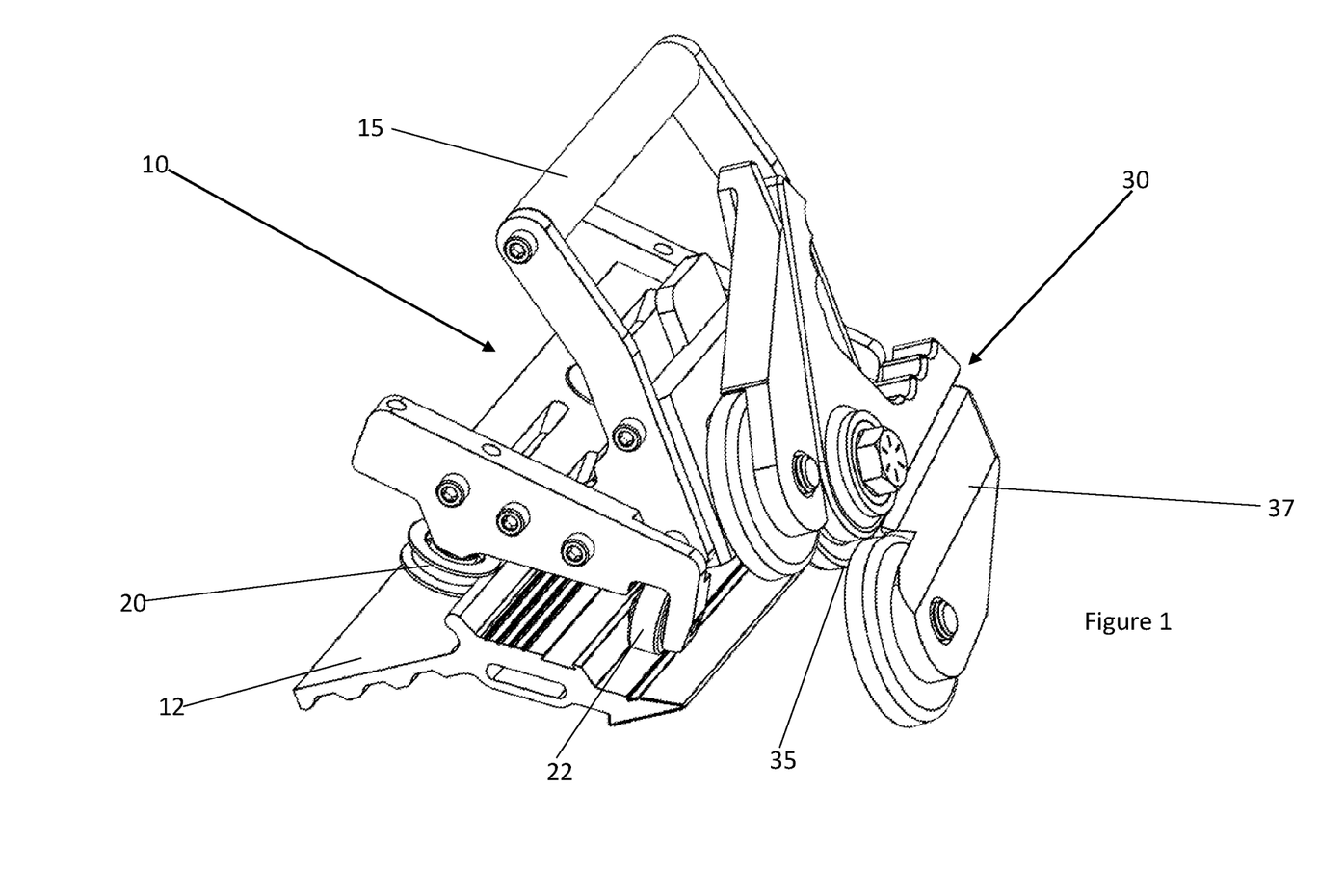
FIG. 1 is a perspective view of a reversible cutting tool in a first cutting position, according to an embodiment of the present disclosure.
Figure 2:
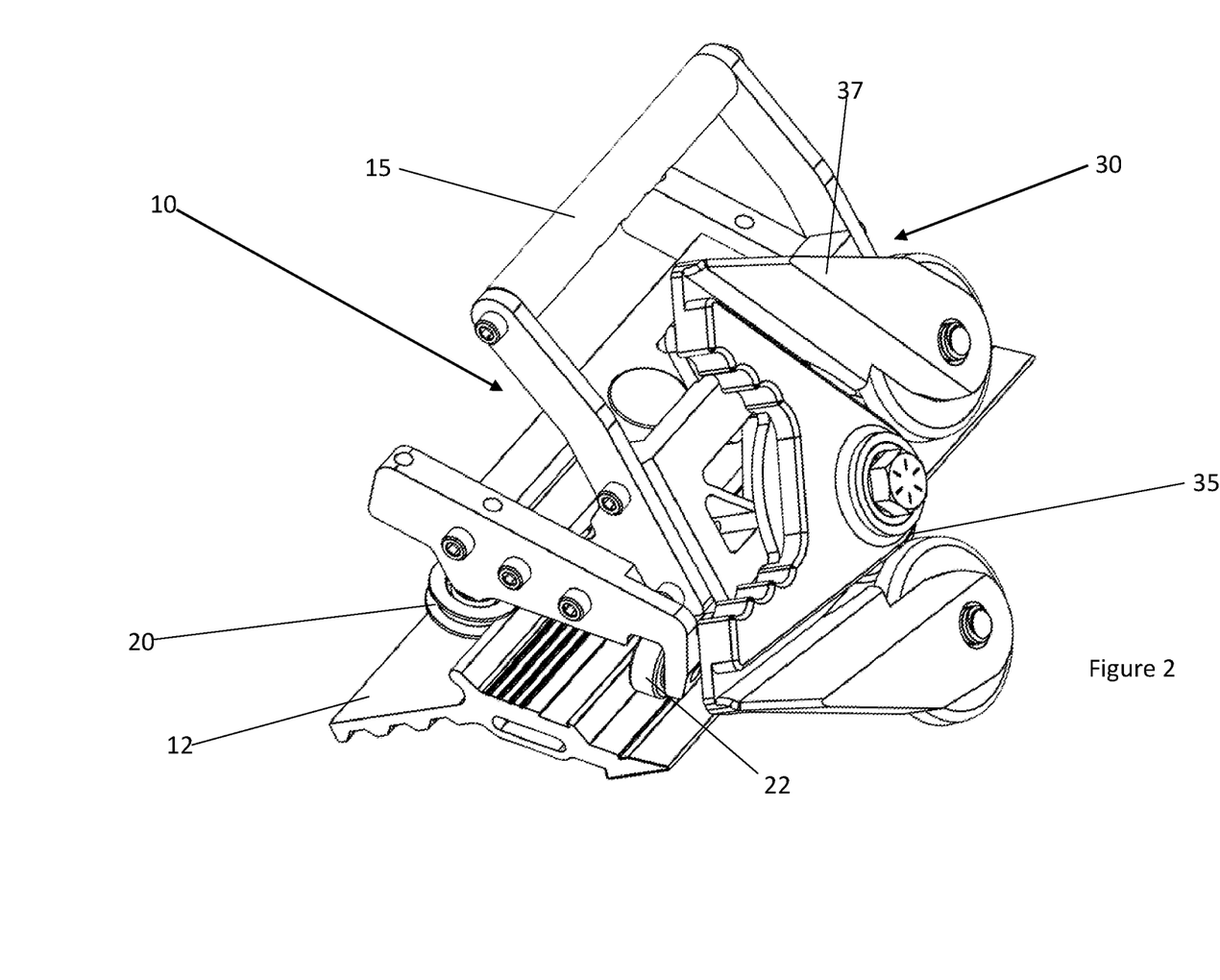
FIG. 2 is a perspective view of the reversible cutting tool of FIG. 1 in a second cutting position, according to an embodiment of the present disclosure.
Figure 3:
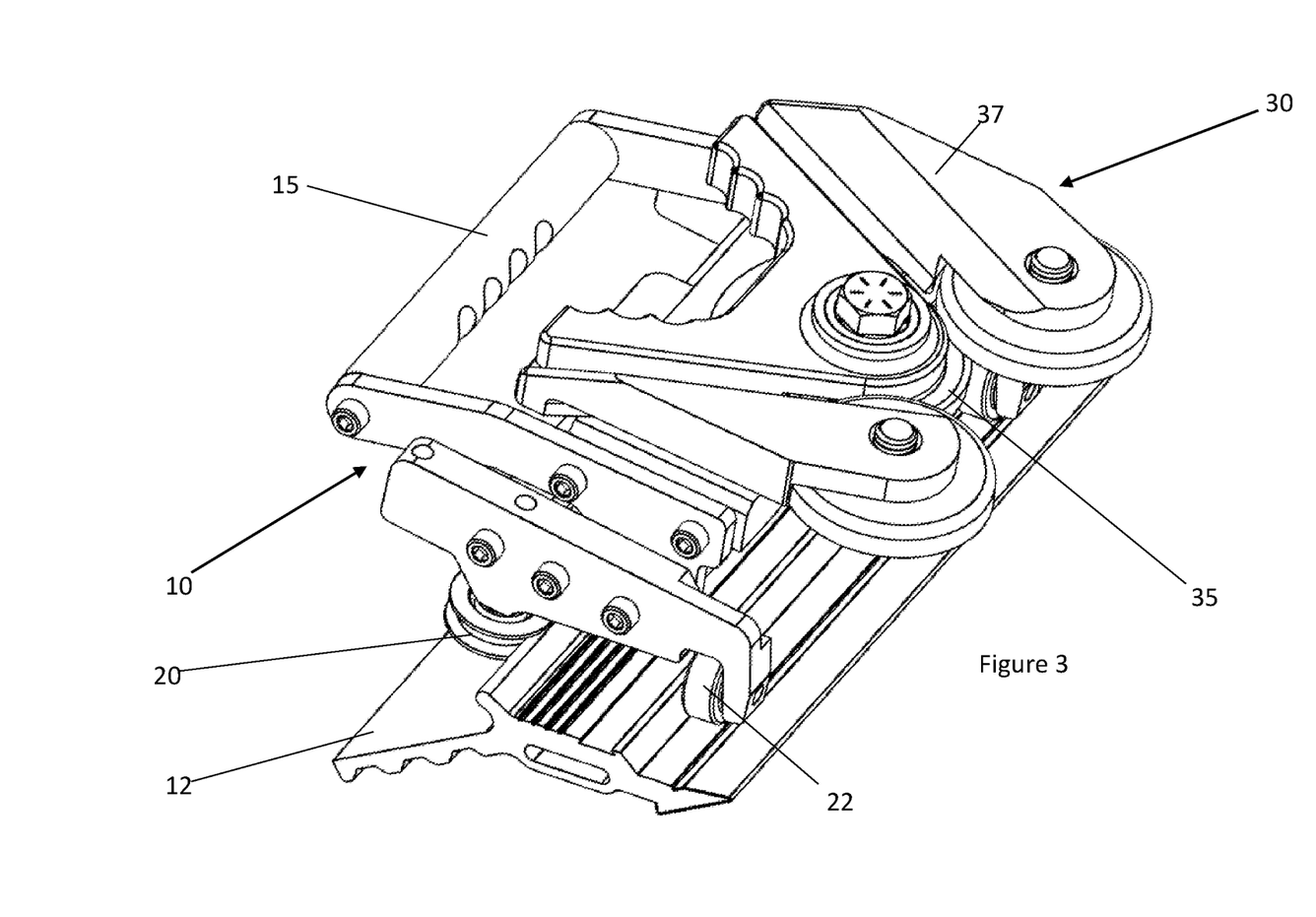
FIG. 3 is a perspective view of the reversible cutting tool of FIG. 1 in a third storage position, according to an embodiment of the present disclosure.

With reference to FIGS. 1, 2 and 3, and according to an embodiment of the present disclosure, a reversible cutting tool 10 is shown, the cutting tool 10 to be used in association with press brakes 12. The reversible cutting tool 10 is preferably comprised of a handle portion 15, a pair of right-side wheels 20, 22 and a pair of left-side wheels (not shown). Together, the handle 15 and right-side wheels 20, 22 and left-side wheels (not shown) guide the cutting tool 10 along the press brake 12. A worker skilled in the art would appreciate that although wheels are shown, other components are possible such as sliding components, provided that they allow the cutting tool 10 to glide along the press brake 12 with reduced friction. The cutting tool 10 is further comprised of an adjustable cutting mechanism 30 to allow the cutting tool 10 to move in two opposed directions and be stored in a storage position. The cutting tool 10 is further comprised of a blade portion 35 secured to a blade housing 37, the blade portion 35 to cut a piece of material such as sheet metal (not shown). The adjustable cutting mechanism 30 is pivotable and allows the cutting tool 10 to cut the sheet metal in two directions. A worker skilled in the art would appreciate that FIG. 1 shows the cutting tool 10 cutting in a first position, while FIG. 2 shows the cutting tool 10 cutting in a second, opposite position. With specific reference to FIG. 3, the cutting tool 10 is shown in a third storage position.

Figure 4:
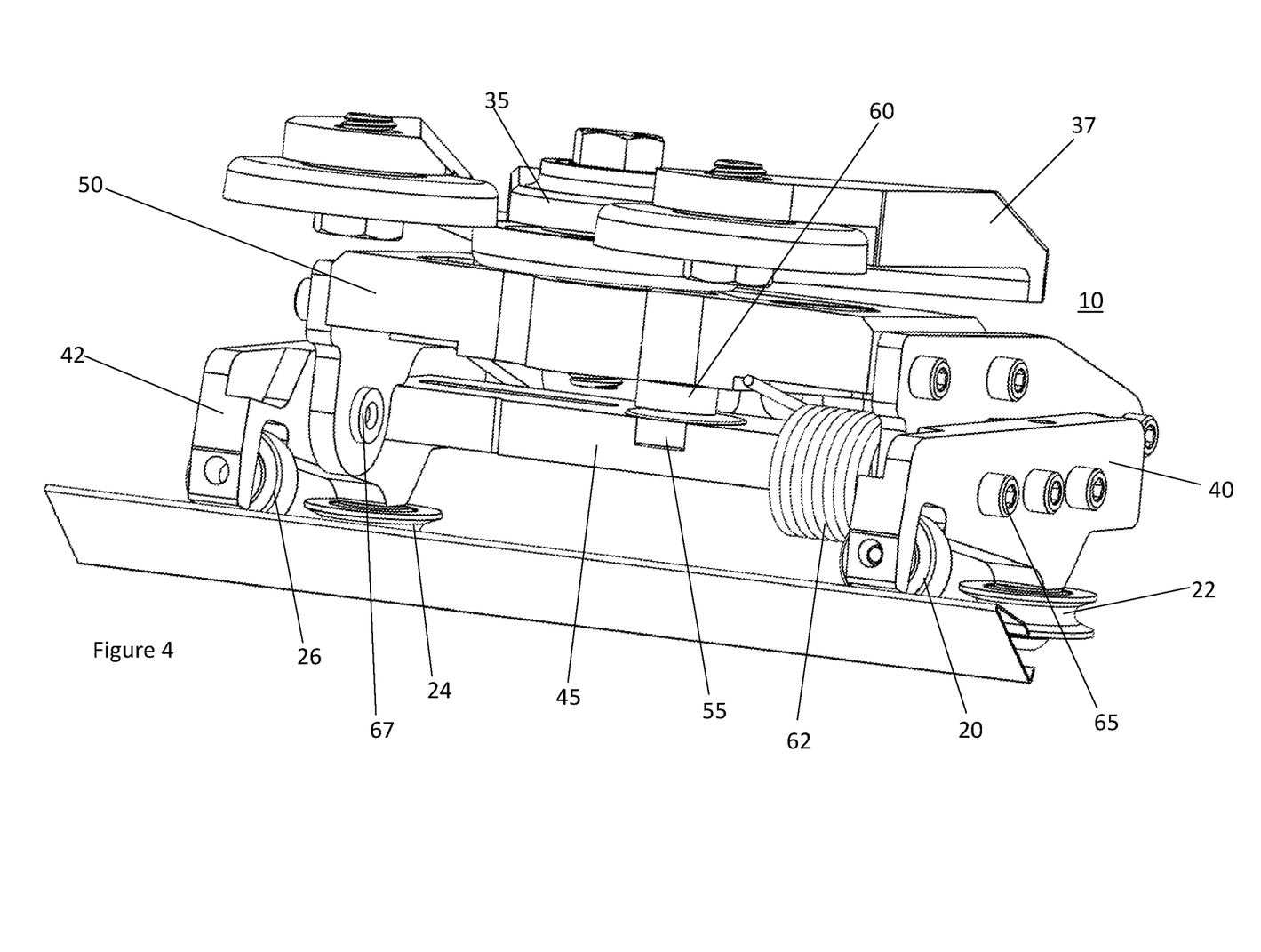
FIG. 4 is a front perspective view of the reversible cutting tool of FIG. 1 in the third storage position, according to an embodiment of the present disclosure.
Figure 5:
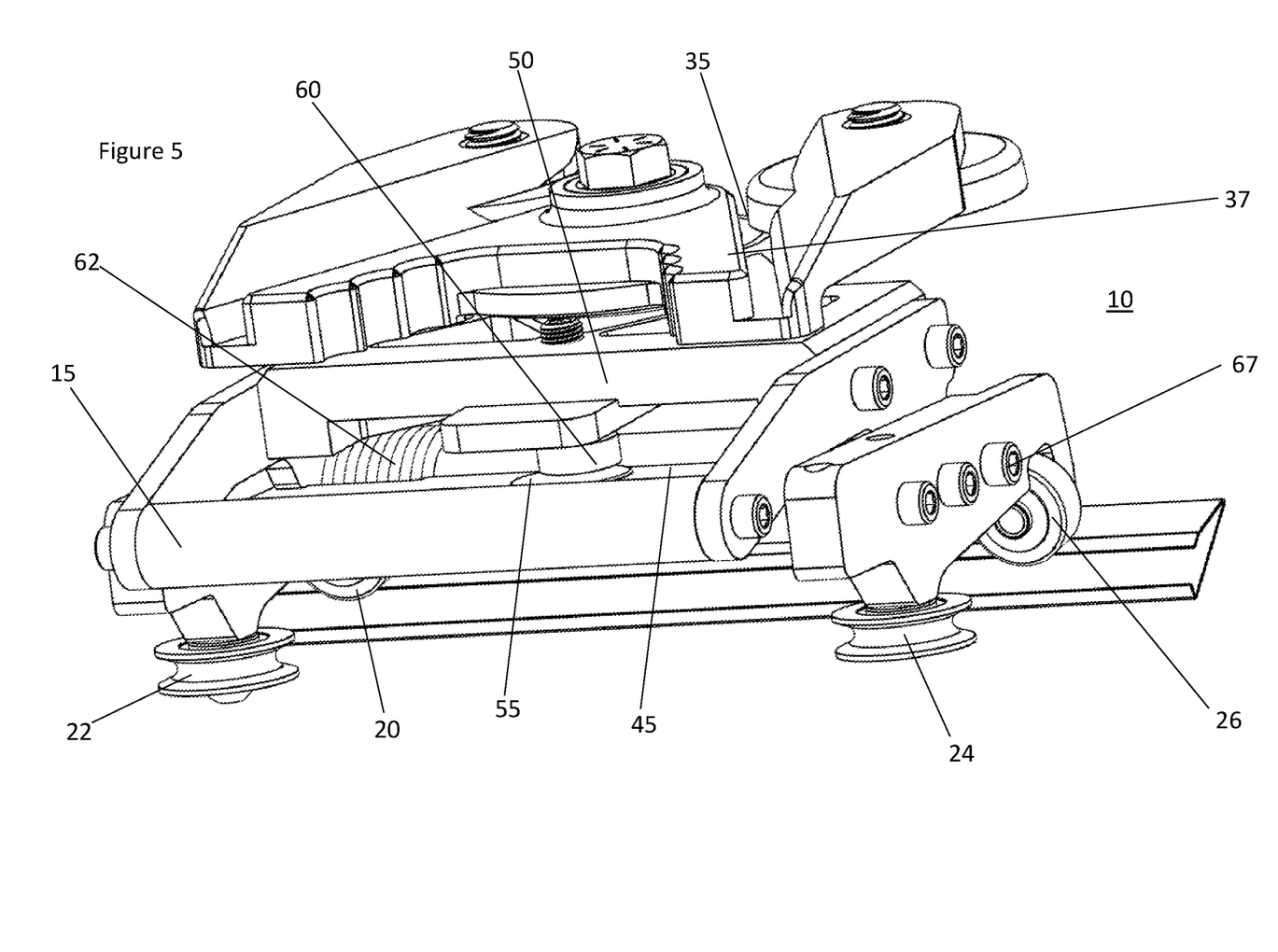
FIG. 5 is a rear perspective view of the reversible cutting tool of FIG. 1 in the third storage position, according to an embodiment of the present disclosure.
Figure 6:
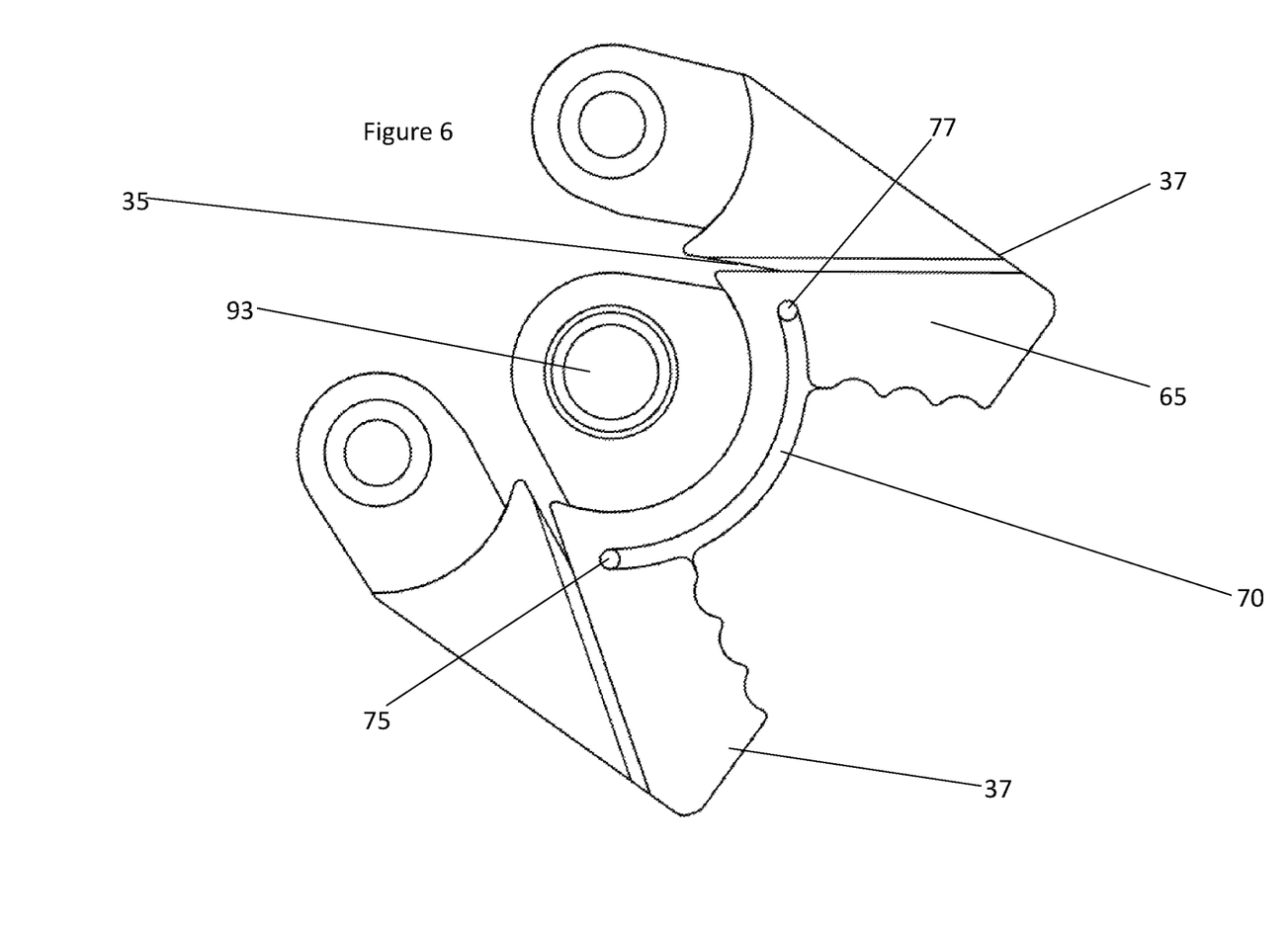
FIG. 6 is a top view of the blade portion and blade housing of the reversible cutting tool of FIG. 1, according to an embodiment of the present disclosure.
Figure 7:
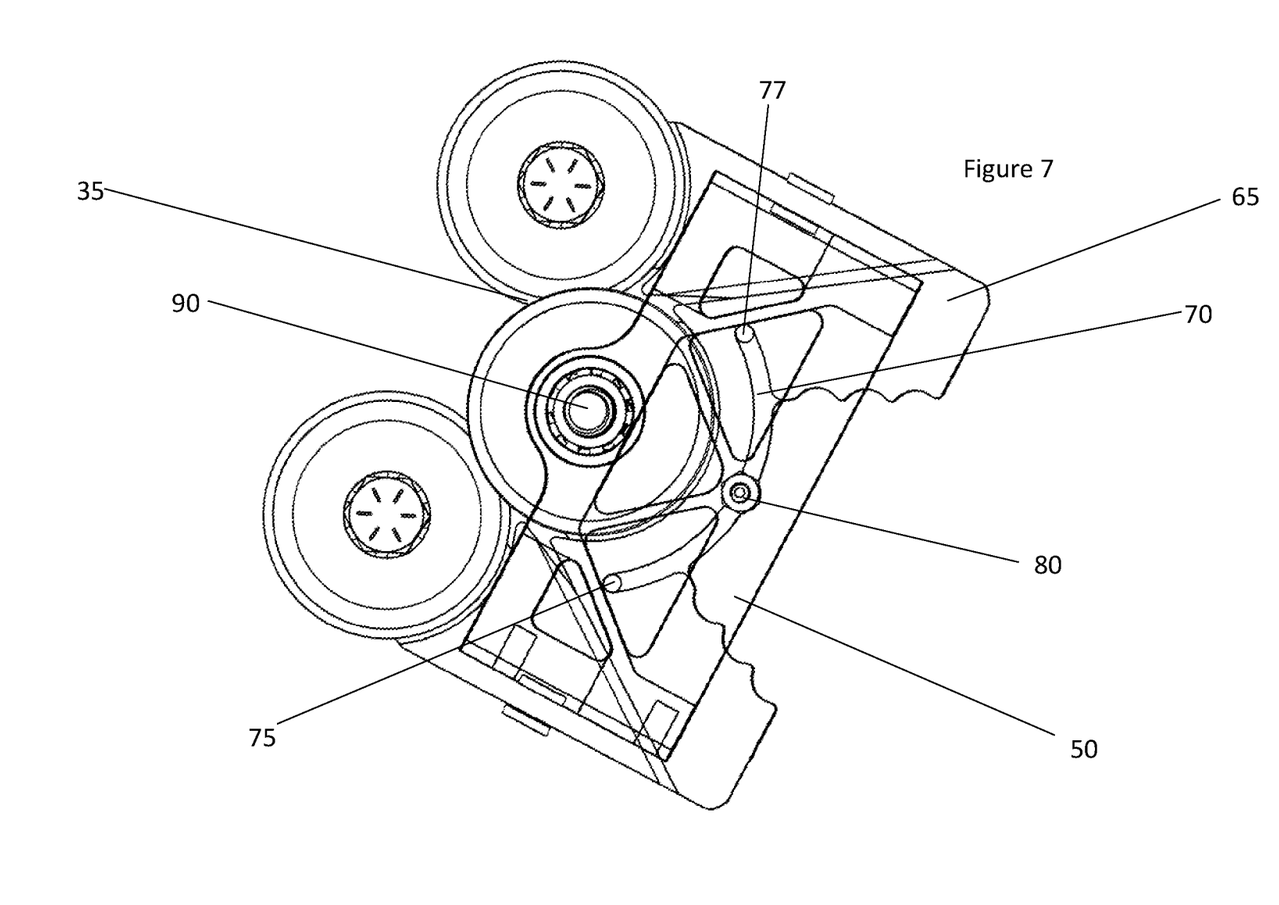
FIG. 7 is a top view of the blade portion, blade housing and a backplate of the reversible cutting tool of FIG. 1 when the reversible cutting tool is in the third storage position, according to an embodiment of the present disclosure.
Figure 8:
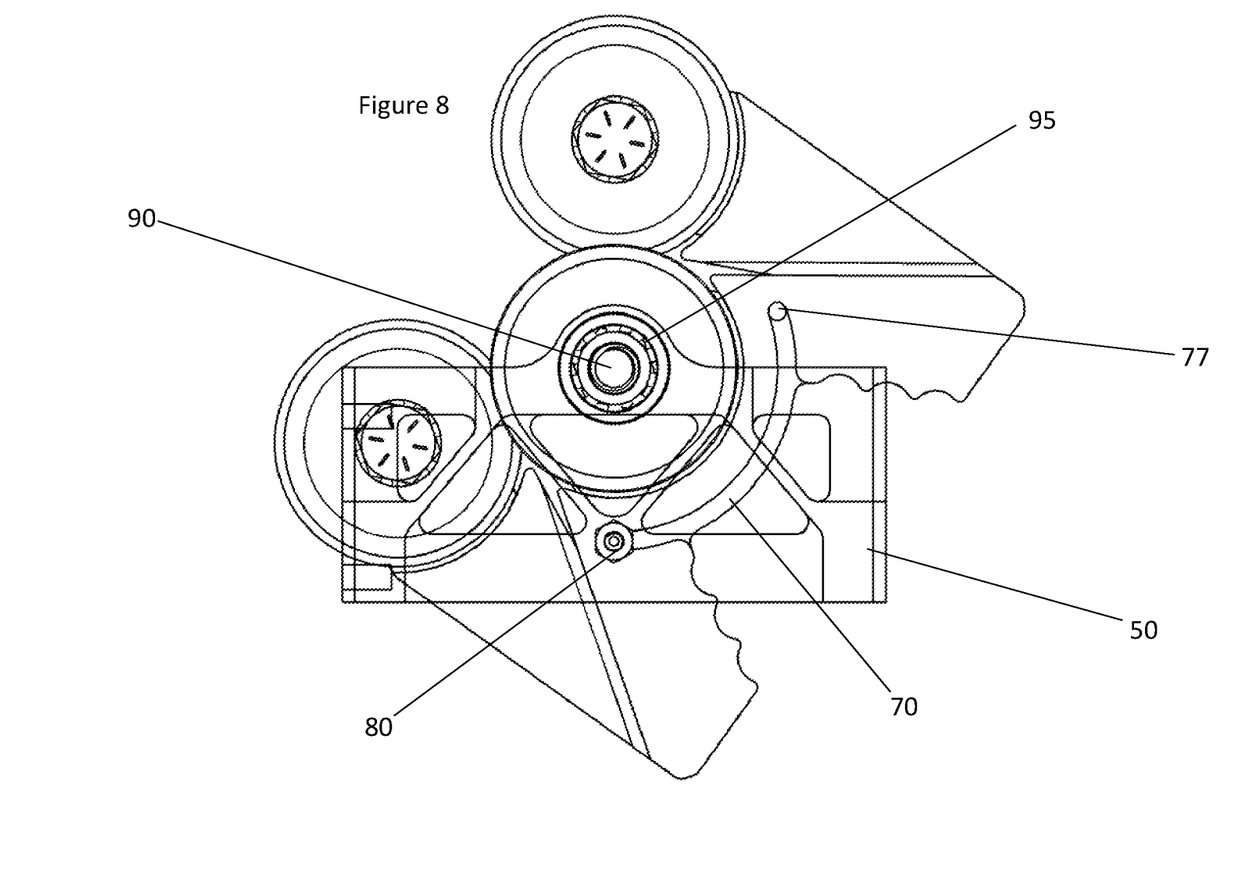
FIG. 8 is a top view of the blade portion, blade housing and the backplate of the reversible cutting tool of FIG. 1 when the reversible cutting tool is in the first cutting position, according to an embodiment of the present disclosure.
Figure 9:
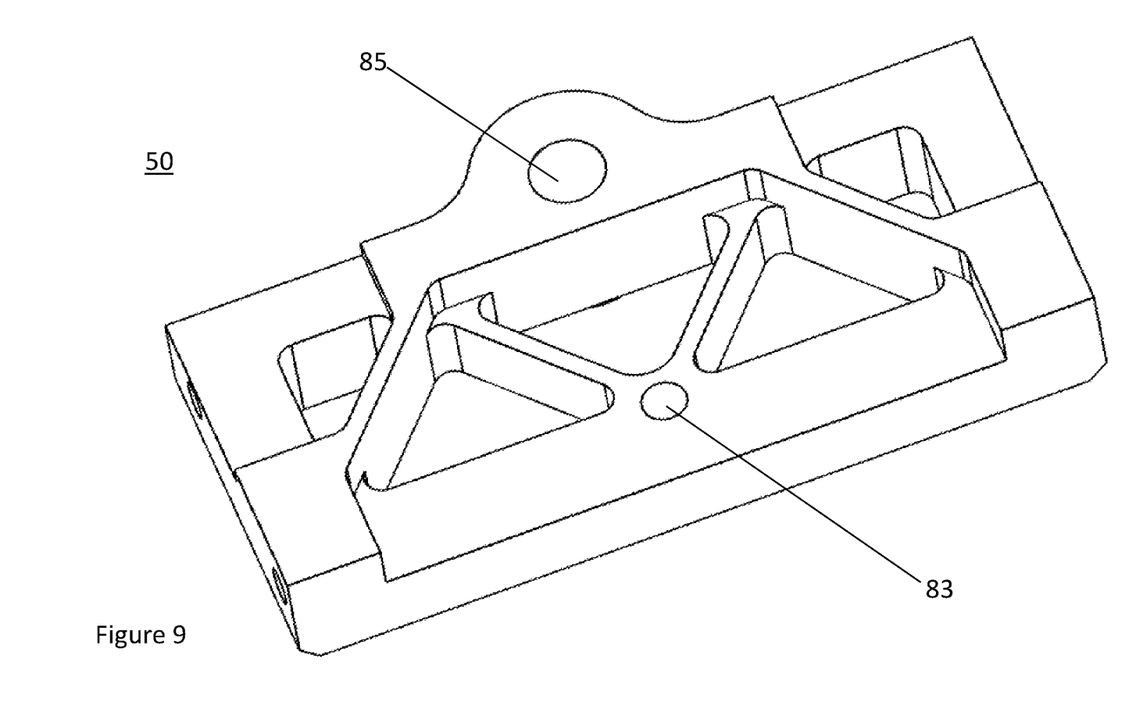
FIG. 9 is a perspective view of the backplate of the reversible cutting tool of FIG. 1, according to an embodiment of the present disclosure.

With reference to FIGS. 4 and 5 and according to an embodiment of the present disclosure, the reversible cutting tool 10 is shown in the third storage position in greater detail. Four wheels 20, 22, 24, 26 are shown secured to arms 40, 42 of the frame of the cutting tool 10. Together, the wheels 20, 22, 24, 26 enable the lateral movement of the cutting tool 10 along the press brake (not shown). The arms 40, 42 are secured to and separated by a crossbar 45, the crossbar 45 engageable with a backplate 50. Indeed, the crossbar 45 is further comprised of a magnet 55 to magnetically engage with a ferromagnetic member 60 secured of the backplate 50. The crossbar 45 is further comprised of a coil 62 that biases the backplate 50 toward the crossbar 45. The handle portion 15 is secured to the backplate 50 by means of bolts, although other connections means are possible. The handle portion 15, along with the backplate 50 and cutting portion 35 attached thereto, are pivotable about the axis of rear bolts 65, 67. In this third storage position, the handle portion 15 is pivoted about the axis of bolts 65, 67 by means of coil 62, until the backplate 50 is above and adjacent to the crossbar 45. Indeed, a purpose of the coil 62 is to exert continuous pressure on the backplate 50 and handle portion 15 to force the backplate 50 and handle portion 15 to pivot back to the storage position, when the magnet 55 is engaged with the ferromagnetic member 60. As the blade portion 35 is secured to the backplate 50, the blade portion 35 also pivots along with the handle portion 15. To move the cutting tool 10 back from the storage position to one of the cutting positions, the handle portion 15 is pivoted about the axis of bolts 65, 67, overcoming the force exerted by the coil 62 and the magnetic force acting on the ferromagnetic member 60 from the magnet 55. The blade portion 35 and blade housing 37 are then pivoted along the axis of the bolt (90 shown in FIGS. 7, 8, 10 and 11) to lock into one of the two cutting positions as further described below.

Figure 10:
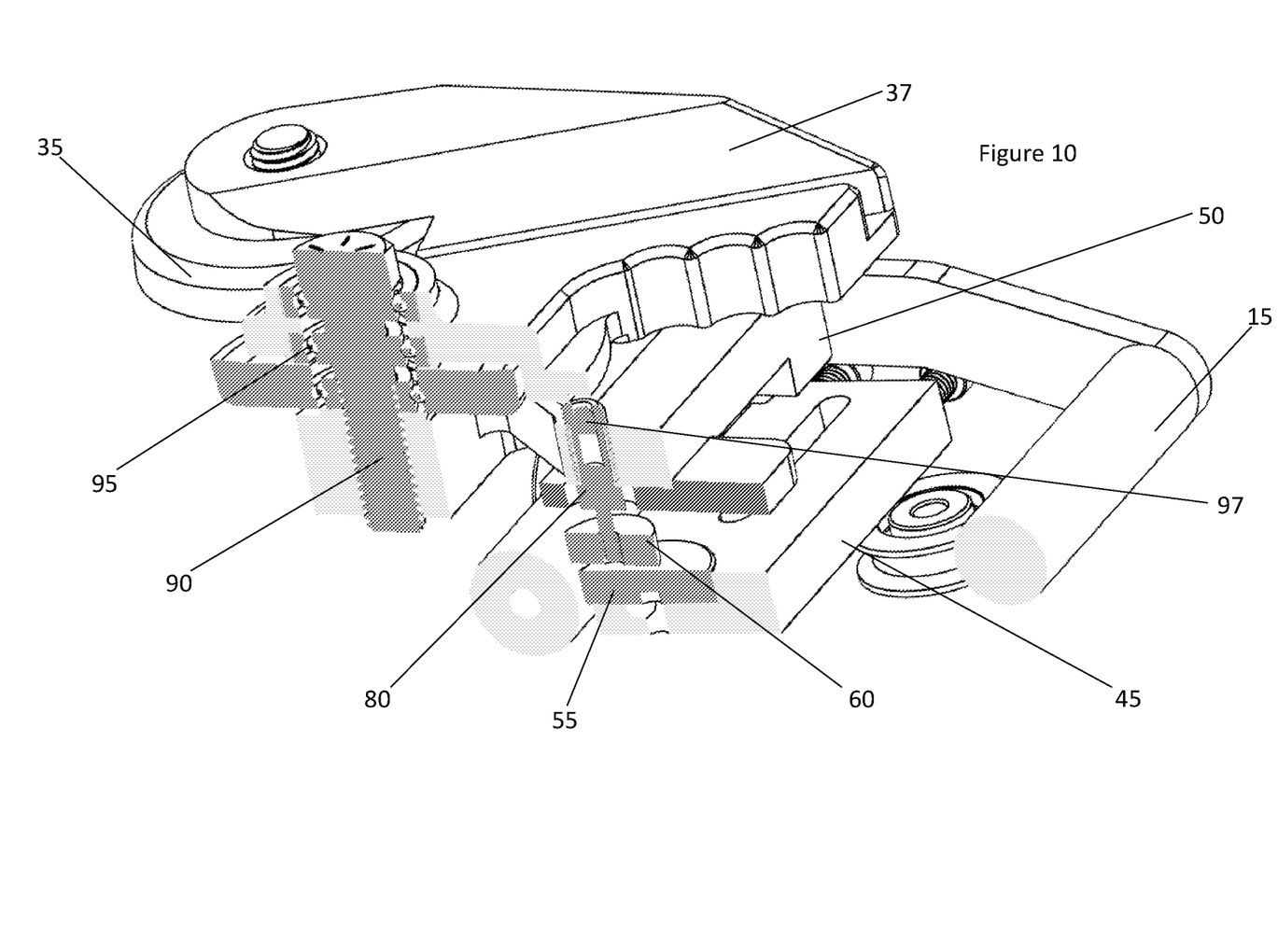
FIG. 10 is a perspective cross-sectional view of the cutting tool of FIG. 1 in the storage position, according to an embodiment of the present disclosure; and, FIG. 11 is a perspective cross-sectional view of the cutting tool of FIG. 1 in the first cutting position, according to an embodiment of the present disclosure.
Figure 11:
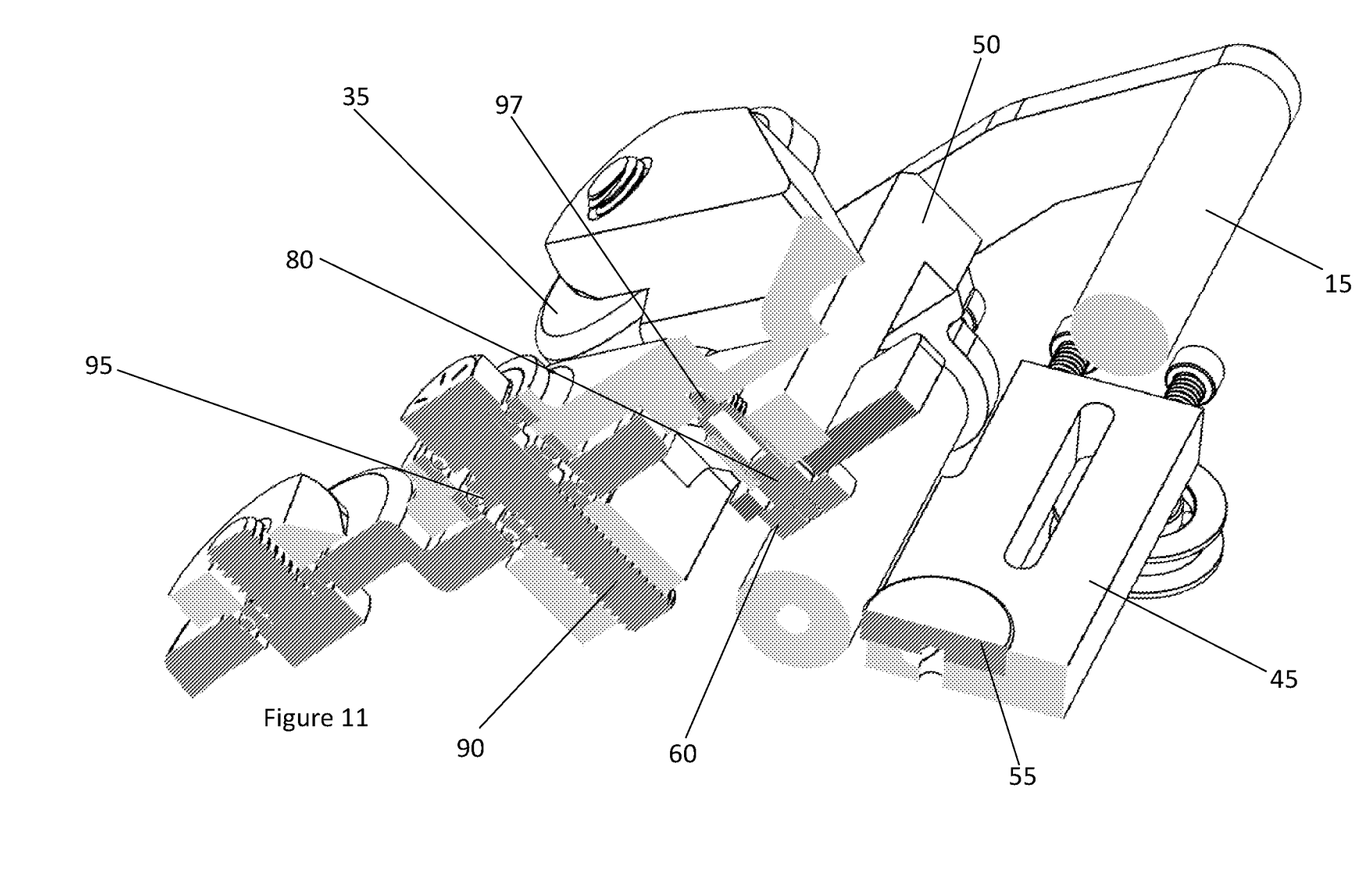

With reference to FIGS. 6, 7, 8, 9, 10 and 11 and according to an embodiment of the present disclosure, the adjustable cutting mechanism, which is positioned in between the cutting portion 35, cutting housing 37 and the backplate 50, is shown and described. The adjustable cutting mechanism is comprised of a channel 70, the channel 70 positioned on an underside 65 of the housing 37 of the blade portion 35. The channel 70 is generally U-shaped. Within the channel 70 are formed two cavities 75, 77. The adjustable cutting mechanism is further comprised of a plunger 80 secured into an aperture 83 and to the ferromagnetic member 60 of the backplate 50. Together, the channel 70 and cavities 75, 77 of the blade portion 35 engage with the spring plunger 80. More specifically, the plunger 80 can slide along the channel 70 and lock into one of the two cavities 75, 77. The backplate 50 is further comprised of an opening 85 through which is secured a bolt 90, the bolt 90 also fitted through a hole 93 of the blade portion 35. The bolt 90 is engageable with ball bearings 95 so that the blade portion 35 is pivotable about the bolt 90. As shown, the distance between the aperture 83 and opening 85 of the backplate 50 is equal to the distance between the channel 70 and the center of the hole 93 of the blade portion 35. As such, a worker skilled in the art would appreciate that the adjustable cutting mechanism enables the blade portion 35 to move with respect to the backplate 50 by movement of the spring plunger 80 along the length of the channel 70. As specifically shown in FIGS. 7 and 10, the blade portion 35 is shown in the third storage position, when the plunger 80 is in the middle position of the channel 70, approximately halfway between the cavities 75, 77. Meanwhile, as specifically shown in FIGS. 8 and 11, the blade portion 35 is shown in a first cutting position, when the plunger 80 is in the cavity 75. In this position, the plunger 80 has slid along the channel 70 and been locked into place in the cavity 75. A worker skilled in the art would appreciate that the plunger 80 is comprised of a bolt 97 biased by a spring (not shown) so that the bolt 97 automatically penetrates the cavity 75 as the plunger 80 slides along the channel 70. To unlock the blade portion 35 from one of the first position or the second position, an operator releases the handle portion 15. Indeed, by releasing the handle portion 15, the coil (not shown) biasing the backplate 50 will force the handle 15, which is secured to the backplate 50, back toward the crossbar 45 and into the third storage position. Once in the third storage position, the magnet 55 will engage the ferromagnetic member 60 of the plunger 80, which will relieve pressure on the spring (not shown) of the plunger 80. In turn, the bolt 97 will retract as shown in FIG. 10, and the plunger 80 will no longer be locked into any one of the cavities 75, 77, such that the plunger 80 can pivot freely along the channel 70.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. A reversible cutting tool for use with press brakes, the reversible cutting tool comprising:
    a handle portion to grip the cutting tool;
    sliding components engaged with the handle portion to move the cutting tool along a length of the press brake;
    a blade portion connected to the sliding components to cut a material; and, an adjustable cutting mechanism allowing the blade portion to cut the material in a first direction and a second direction, the adjustable cutting mechanism comprising:
        a channel positioned on an underside of the blade portion; and,
        a plunger secured to a crossbar, the plunger adapted to slide along the channel,
    wherein the plunger slides from a first position to a second position along the channel, the first position for the blade portion to cut the material in the first direction, the second position for the blade portion to cut the material in the second direction.

2. The reversible cutting tool of claim 1 wherein the channel is further comprised of two cavities configured to receive the plunger.

3. The reversible cutting tool of claim 1 further comprised of a magnet to engage the plunger.

4. The reversible cutting tool of claim 1 wherein the blade portion is positioned on a backplate, the backplate secured to the handle portion.

5. The reversible cutting tool of claim 4 further comprised of a coil to bias the backplate toward the crossbar.

6. The reversible cutting tool of claim 1 wherein the sliding components are two pairs of wheels.

7. The reversible cutting tool of claim 1 wherein the plunger slides along the channel to a third storage, non-cutting position.

8. The reversible cutting tool of claim 7 wherein the third storage, non-cutting position of the plunger is positioned along the channel in between the first and second positions.

* * * * *